United States Patent
Dong et al.

(10) Patent No.: US 8,553,734 B2
(45) Date of Patent: Oct. 8, 2013

(54) FREQUENCY CONVERSION OF LASER RADIATION

(71) Applicant: TRUMPF Laser Marking Systems AG, Gruesch (CH)

(72) Inventors: Shalei Dong, Chur (CH); Sven Joosten, Fideris (CH); Carsten Ziolek, Seewis-Dorf (CH)

(73) Assignee: Trumpf Laser Marking Systems AG, Gruesch (CH)

( * ) Notice: Subject to any disclaimer, the term of this patent is extended or adjusted under 35 U.S.C. 154(b) by 0 days.

(21) Appl. No.: 13/632,222

(22) Filed: Oct. 1, 2012

(65) Prior Publication Data
US 2013/0028277 A1    Jan. 31, 2013

Related U.S. Application Data

(63) Continuation of application No. PCT/EP2011/053687, filed on Mar. 11, 2011.

(30) Foreign Application Priority Data

Apr. 1, 2010 (DE) .......................... 10 2010 003 591

(51) Int. Cl.
*H01S 3/10* (2006.01)
(52) U.S. Cl.
USPC ............................................. 372/21; 372/22
(58) Field of Classification Search
USPC ...................................... 372/21, 22
See application file for complete search history.

(56) References Cited

U.S. PATENT DOCUMENTS

| 5,500,865 | A | 3/1996 | Chakmakjian et al. |
| 7,352,505 | B2 | 4/2008 | Nebel et al. |
| 2003/0043452 | A1* | 3/2003 | Heist .............................. 359/326 |
| 2006/0250677 | A1 | 11/2006 | Hoffman et al. |

FOREIGN PATENT DOCUMENTS

| DE | 10143709 A1 | 4/2003 |
| DE | 10147362 A1 | 4/2003 |
| EP | 0503875 A2 | 3/1992 |
| EP | 0854380 A2 | 1/1998 |

OTHER PUBLICATIONS

Notification of Transmittal of the International Preliminary Report on Patentability from corresponding PCT Application No. PCT/EP2011/053687, mailed Oct. 11, 2012, 9 pages.
International Search Report from corresponding PCT Application No. PCT/EP2011/053687, mailed Apr. 5, 2011, 4 pages.

* cited by examiner

*Primary Examiner* — Armando Rodriguez
(74) *Attorney, Agent, or Firm* — Fish & Richardson P.C.

(57) ABSTRACT

A system includes: a first nonlinear crystal arranged to receive to a first laser beam having a first wavelength $\lambda_1$ and operable to generate, by frequency doubling of the first laser beam, a second laser beam having a second wavelength $\lambda_2$, in which the second beam propagates collinearly with the first beam; a second nonlinear crystal arranged to receive the first and second laser beams from the first crystal, in which the second crystal is operable to generate, by frequency mixing of the first and second laser beams, a third laser beam having a third wavelength $\lambda_3$; and one or more lenses between the first and second crystals, in which the one or more lenses are operable to spatially separate the first and second beams. The first and second laser beams propagate at an offset and/or titled with respect to an optical axis in order to cause the spatial separation.

13 Claims, 1 Drawing Sheet

FREQUENCY CONVERSION OF LASER RADIATION

CROSS REFERENCE TO RELATED APPLICATIONS

This application is a continuation of and claims priority under 35 U.S.C. §120 to PCT Application No. PCT/EP2011/053687, filed on Mar. 11, 2011, which claims priority to Germany Application No. 10 2010 003 591.2, filed on Apr. 1, 2010. The contents of both of these priority applications are hereby incorporated by reference in their entirety.

TECHNICAL FIELD

The present disclosure relates to frequency conversion of laser radiation.

BACKGROUND

To produce ultraviolet (UV) laser light having medium power, e.g., in a power range from about 0 to 30 Watt, from a first (i.e., fundamental) wavelength (e.g., $\lambda_1=1064$ nm) delivered by a laser oscillator, it is possible, in a first step, to generate, using a first nonlinear crystal with noncritical phase matching, a frequency-doubled laser beam having a second (i.e., second harmonic) wavelength (e.g., $\lambda_2=\lambda_1/2=532$ nm) in a process called "second harmonic generation" (SHG). Here, the beam having the fundamental wavelength and the beam having the second harmonic are linearly polarized and have polarization directions perpendicular to each other. Using a second nonlinear crystal with critical phase matching, the fundamental wave and the second harmonic then generate a third laser beam having a sum-frequency according to $1/\lambda_3=1/\lambda_1+1/\lambda_2=3/\lambda_1$ in a process called "sum-frequency generation" (SFG). In the present example, the third laser beam would have a wavelength $\lambda_3=355$ nm, which lies in the UV range.

In SFG, the critical phase matching in the nonlinear crystal causes the wave vectors, k, of the three waves participating in the frequency mixing to fulfill the condition $k_3=k_2+k_1$. For SHG the wave vectors follow the expression $k_2=2k_1$. Because of the birefringent properties of the nonlinear crystal, the critical phase matching in SFG leads, however, to a first beam of the two incoming laser beams (e.g., extraordinary polarized wave) running away from the second incoming laser beam (e.g., ordinarily polarized wave) at a so-called "walk-off" angle. The two laser beams are then, after a certain propagation distance, separated within the nonlinear crystal and have what is called a spatial walk-off.

In the generation of UV laser light of medium power in the manner described initially, the fundamental wave in the second nonlinear crystal is typically ordinary-polarized while the second harmonic in the nonlinear crystal is extraordinary-polarized, so that the walk-off effect occurs in the second nonlinear crystal. In the first nonlinear crystal, on the other hand, a noncritical phase matching is used, so that no walk-off effect occurs there, and the fundamental wave and the second harmonic emerge collinearly from the crystal.

The walk-off between the fundamental wave and the second harmonic in the second nonlinear crystal reduces the efficiency of conversion when generating the third harmonic (e.g., UV radiation), since the interaction length, in which the frequency conversion takes place, decreases. Compensating the walk-off effect extends the interaction length, the result being that the conversion efficiency when generating the UV radiation increases markedly.

DE10143709 A1 discloses a method for compensating the walk-off effect during frequency conversion. In this method a first nonlinear lithium triborate (LBO) crystal having noncritical phase matching is used for frequency doubling and a second LBO crystal with critical phase matching is used to generate the third harmonic. Between the first and the second nonlinear crystal there is arranged a birefringent crystal, in which nonlinear optical properties are avoided. The birefringent crystal generates a walk-off, which leads to a beam offset of the fundamental wave and the second harmonic on the second nonlinear crystal. The beam offset is directed opposite to the walk-off of the second LBO crystal and is intended to compensate this.

In the construction described in DE10143709 A1, however, the additional birefringent crystal has to be positioned in the beam path, leading to more adjustment work. Since the birefringence of the crystal that counteracts the walk-off effect of the second nonlinear crystal is temperature—dependent, the birefringent crystal used for separating the laser beams must also be maintained at a constant temperature.

EP 0503875 A2 discloses a further possibility for compensating walk-off in nonlinear crystals with critical phase matching. In this case, the walk-off between the ordinary and the extraordinary beam is compensated by both beams striking the nonlinear crystal with critical phase matching collinearly at an angle to the crystal surface. When the laser light strikes the crystal at an angle, refraction occurs and the wave vector of the radiation changes depending on the polarization direction by a different amount. With a correct choice of angle of incidence and the orientation of the crystal axis (axes) relative to the entrance face of the crystal it is therefore possible to compensate the walk-off effect. This solution requires a suitably cut and adjusted nonlinear crystal, however. The crystal axis/axes is/are typically not oriented perpendicular or parallel to the crystal surface, but instead run at an angle to the crystal surfaces. The angle at which the crystal is cut must therefore be extremely precise, since an imprecise cutting angle cannot be compensated by a tilting or rotation of the entire crystal.

US 2006/0250677 discloses a solution for compensating walk-off in which the laser beams are likewise incident on the nonlinear crystal at the same point, but have previously been separated by means of an optical system, so that the angles of incidence of the laser beams with respect to the crystal surface are different from each other. Whereas one of the laser beams strikes the crystal surface, e.g. perpendicularly with respect to the crystal surface, the other laser beam strikes the nonlinear crystal at non-perpendicular angle. A biprism is positioned in front of the nonlinear crystal as the optical system for separating the incident beams. When using laser beams of different wavelength, a dichroic beam splitter can optionally be used. However, since the crystal axis runs at an angle to the crystal surface, the cut of the nonlinear crystal should be extremely precise in order to achieve maximum walk-off compensation.

SUMMARY

The present disclosure covers methods and devices for compensating the walk-off effect in an especially simple manner.

In certain aspects, the disclosure features an optical system that includes a lens in order to produce the spatial separation of the laser beams. Since, in a typical system, the laser beams are usually focused (e.g., at the pump powers disclosed herein) using a lens arranged in the path for beam shaping and imaging, an advantage of the present system is that the same lenses can, in certain implementations, also be used for spatial separation of the laser beams.

In general, in a first aspect, the present disclosure features a system that includes a first nonlinear crystal arranged to produce, by frequency doubling, a second laser beam having a second wavelength from a first incoming laser beam having a first wavelength, in which the second laser beam propagates collinearly with respect to the first laser beam. The system also includes a second nonlinear crystal arranged to produce, by frequency mixing, a third laser beam having a third wavelength from the first and second laser beams. An optical device, such as one or more lenses, arranged in the beam path between the first and the second nonlinear crystals, introduces an offset between the first and second laser beams.

The optical device can cause spatial separation of the collinear beams based on wavelength-dependent properties of the optical device and/or based on modifying a position of the optical device with respect to an optical axis. For example, the optical device can include a lens, where the laser beams are offset or tilted with respect to the optical axis such that the beams strike the lens entrance face and the lens exit face at non-perpendicular angles. Due to the different wavelengths of the first beam and the second beam, each of the laser beams is refracted with a different angle. After exiting the lens, the laser beams therefore no longer propagate collinearly, but are at an angle with respect to each other. A relatively small displacement or tilting of the laser beams relative to the optical axis of the lenses is sufficient to compensate the spatial walk-off effect, such that too great an ellipticity of the laser beams can be avoided.

In some implementations, focusing lenses, such as converging lenses in the form of biconvex lenses, are used as the optical device in the optical system. Other types of converging lenses may optionally be used, however, including, e.g. planoconvex or concave-convex lenses. The lens material used can have a wavelength-dependent refractive index, in which the difference in the refractive index for the different laser wavelengths used preferably is as a large as possible. At the wavelengths of 1064 nm and 532 nm, quartz glass and BK7 glass have proved especially suitable lens materials. For example, the refractive index difference between 1064 nm and 532 nm in the case of quartz glass is at about $\Delta n=0.0108$. In the case of BK7 glass, the difference is about $\Delta n=0.01284$. Other materials normally have smaller refractive index differences.

As an alternative to or in addition to displacement or tilting of the lens or lenses, at least one of the lenses can include birefringent material, in order to cause the spatial separation between the laser beams. Since the lens is already used in the optical system for focusing, there is no increased adjustment work when using the lens for separating the laser beams.

An advantage of using the optical device (e.g., the lens) to generate a beam offset between the first and the second laser beam on a beam entrance face of the second nonlinear crystal, is that a cuboidal standard crystal can be used. The separated laser beams can also, if need be, strike at different angles at a common point on the entrance face of a correspondingly cut nonlinear crystal in order to compensate the walk-off effect.

In some implementations, the optical system comprises a first lens for collimation of the first laser beam and the second laser beam emerging from the first nonlinear crystal and a second lens for focusing the first laser beam and the second laser beam onto the second nonlinear crystal. If the laser beams propagate eccentrically through both lenses, both lenses can contribute to the separation of the laser beams. In this manner, an adequate separation of the laser beams can be achieved without introducing too large of an offset of the laser beams with respect to the optical axis The optical system may also comprise more or fewer than two lenses. A further advantage of using the lenses is that the laser beam having the shorter wavelength can be refracted somewhat more strongly, so that the focus of the second laser beam (e.g., a laser beam having a wavelength equal to about 532 nm) lies closer to the lens than the focus of the first laser beam (e.g., a laser beam having a wavelength equal to about 1064 nm). As a result, within the interaction length in the second crystal, the diameter of the second laser beam is somewhat smaller than the diameter of the first laser beam, which is advantageous for the frequency conversion. Nevertheless, the positive effect produced in this way for the frequency conversion is smaller than the effect achieved by the spatial walk-off compensation.

In some implementations, the system includes an additional lens arranged in front of the first nonlinear crystal, in which the lens serves to focus the laser radiation onto the first nonlinear crystal. The additional lens can increase the conversion efficiency in the first nonlinear crystal. The focal length of the additional lens can in this case correspond, for example, to the focal length of the first lens.

In some implementations, the system includes a movement device for moving the at least one lens used for the separation perpendicularly to the optical axis. As stated above, the fundamental wave and the second harmonic are focused in the second crystal for UV-generation using one or more lenses. By displacing the lens or lenses in the critical direction from the optical axis, the laser beams diverge by refraction and, as a result, a beam offset between the two laser beams can be produced, such that the interaction length in the second nonlinear crystal is extended and the efficiency of the UV generation is increased. Preferably, the beam offset produced by the lenses is selected so that the beams are exactly superimposed in the middle of the second nonlinear crystal.

The movement device can be used to adjust the desired beam offset, which can optionally be modified during a temperature fluctuation of the nonlinear crystal. The movement device can optionally be coupled to a control device, which is further coupled to a detector for measuring the output power of the third laser beam. The control device can adjusts the movement device, and thus the beam offset, in such a manner that the output power reaches a maximum. Alternatively, or in addition, it is also possible to stabilize the crystal temperature.

In some implementations, the first and/or the second nonlinear crystal includes lithium triborate. This material has proved successful in the use of laser radiation having a fundamental wavelength of about 1064 nm, as is delivered, for example, by an $Nd:YVO_4$ laser.

The system can also include a laser oscillator for generating the first laser beam, in which the nonlinear crystals are typically arranged outside the resonator. In some implementations, additional components such as, for example, a laser amplifier, can be disposed between the laser oscillator and the first crystal. When the nonlinear crystals are arranged outside the resonator, the first wavelength that is used for the frequency conversion corresponds to a fundamental wavelength of the laser oscillator, such as, for example, 1064 nm.

Another aspect of the disclosure includes methods for frequency conversion of laser radiation, in which the methods include: generating, in a first nonlinear crystal, a second laser beam having a second wavelength by doubling a frequency of a first laser beam having a first wavelength, in which the second laser beam propagates collinearly with respect to the first laser beam; generating, in a second nonlinear crystal, a third laser beam having a third wavelength from the first and second laser beam by frequency mixing, in which the first and second laser beam are separated from each other by an optical device arranged in the beam path between the first nonlinear crystal and the second nonlinear crystal. In order to produce the separation, the first and second laser beam propagate at an offset and/or tilted with respect to the optical axis through at least one lens.

Alternatively or additionally, the lens can also includes birefringent material in order to effect the separation.

Further advantages are apparent from the description and the drawings. Also, the features mentioned above and hereafter can be used alone or in any combination. The embodiments shown and described are not to be understood as an exhaustive list, but rather are of an exemplary nature for illustration of the invention.

DETAILED DESCRIPTION

Figure 1A:
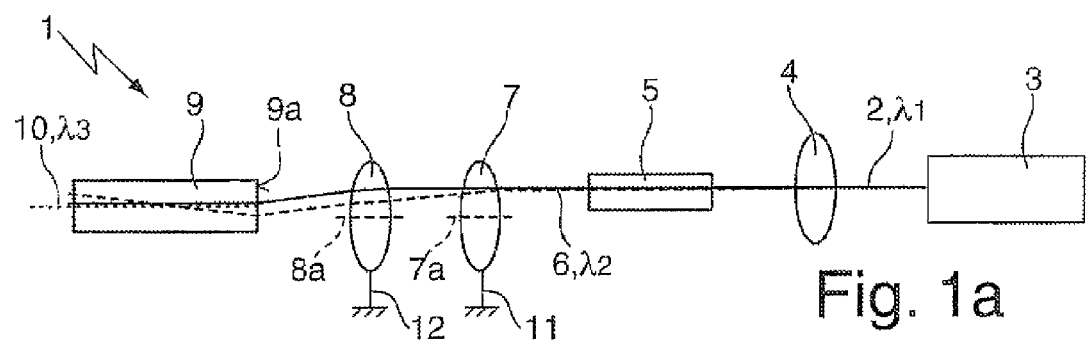
FIGS. 1a and 1b are schematics that illustrate examples of systems for frequency conversion of laser beams.

FIG. 1a is a schematic that shows an example of a system 1 for frequency conversion of a first laser beam 2 having a first wavelength $\lambda_1$, in which the first laser beam 2 is generated by a laser oscillator 3. The first wavelength can be, for example, about 1064 nm. In the present example, the laser oscillator 3 includes an Nd:YVO$_4$ laser crystal as laser medium. The first laser beam 2 emerging from the laser oscillator 3 is focused by a first lens 4 arranged between the laser oscillator and the first optically nonlinear crystal 5. The first optically nonlinear crystal 5 can be, for example, a lithium triborate (LBO) crystal. In the noncritical phase-matched first nonlinear crystal 5 a second laser beam 6 having a second wavelength is generated from the first laser beam 2 by frequency doubling. For example, the second wavelength can be $\lambda_2 \approx \lambda_1/2 \approx 532$ nm. That is, the first nonlinear crystal 5 serves to generate the second harmonic. Owing to the noncritical phase-matching, no walk-off effect occurs in the first nonlinear crystal 5, so that the first laser beam 2 and the second laser beam 6 exit the first nonlinear crystal 5 collinearly. The two laser beams 2, 6 are linearly polarized on exiting the first crystal 5, in which the polarization directions thereof are perpendicular to each other.

After leaving the first crystal 5, the collinear laser beams 2, 6 are collimated with a second lens 7, which has the same focal length as the lens 4 used for the first focusing. Thereafter, the laser beams 2, 6 are focused with a third lens 8 that is arranged between the second lens 7 a second crystal 9. The second crystal 9 also can be, for example, an LBO crystal. The first laser beam 2 and the second laser beam 6 are frequency mixed by the second crystal 9 to generate a third laser beam 10 (e.g., a third harmonic) having a wavelength $\lambda_3$. For example, $\lambda_3$ can be about 355 nm, i.e., in the UV wavelength range. In the second crystal 9, critical phase-matching is used to form the sum-frequency from the first laser beam 2 and the second laser beam 6.

Figure 2A:
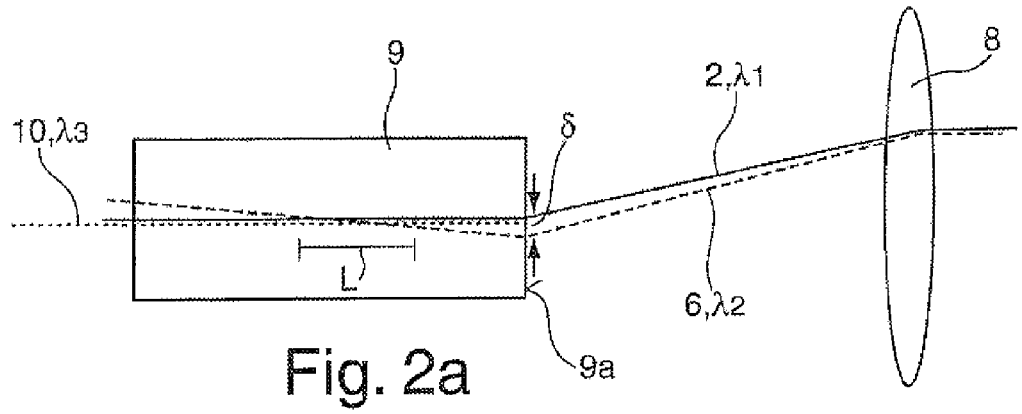
FIG. 2a is a schematic that illustrates an example of a nonlinear crystal with critical phase matching with walk-off compensation.
Figure 2B:
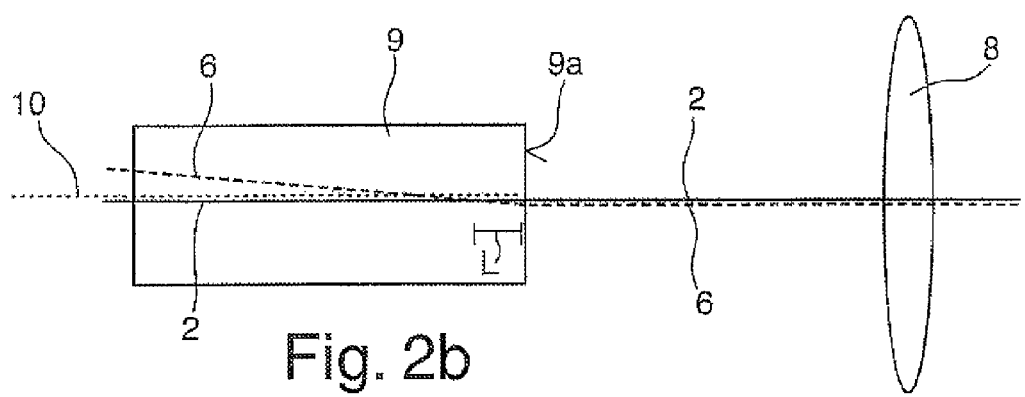
FIG. 2b is a schematic that illustrates an example of a nonlinear crystal without walk-off compensation.

FIG. 2b is a schematic that shows an example of critical phase-matching in the second crystal 9. As illustrated in FIG. 2b, the critical phase-matching leads to a spatial separation of the second laser beam 6 from the first laser beam 2 in the second crystal 9, although both laser beams 2, 6 are incident collinearly and perpendicularly at the same point on an entry plane 9a of the second crystal 9 to. The spatial separation arises as a result of the two laser beams 2, 6 having different polarization directions, so that the second laser beam 6 is extraordinary-polarized in the birefringent second crystal 9, while the first laser beam 2 has an ordinary polarization. The walk-off effect causes the ordinary polarized first beam 2 and the extraordinary-polarized second beam 6 to diverge, and also causes an overlap length L, i.e., a length in the second crystal 9 over which the frequency conversion takes place, to be reduced significantly. The remaining length of the second crystal 9, i.e., the length of the second crystal 9 outside the overlap region, no longer contributes to the generation of laser radiation having the third wavelength $\lambda_3$.

In order to obviate this problem, the first laser beam 2 and the second laser beam 6 are spatially offset from one another with respect to the optical axis 7a and optical axis 8a through the second lens 7 and the third lens 8, respectively, as shown in the arrangement of FIG. 1a. Since the laser beams 2, 6 do not strike the lens surfaces perpendicularly, the beam direction by which the second laser beam 6 (having, e.g., a wavelength $\lambda_2$ of 532 nm) is refracted differs from the beam direction of the first laser beam 2 (having, e.g., a wavelength $\lambda_1$ of 1064 nm). The two laser beams 2, 6 thus diverge and therefore no longer enter the second crystal 9 at the same point, but have a beam offset δ at the entrance face 9a (see, e.g., FIG. 2a). A displacement in a direction perpendicular to the optical axes of the two lenses 7, 8, is selected that causes a displacement of the entry point of the second laser beam 6 in a direction opposite to the walk-off, so that the two laser beams 2, 6 converge in the second crystal 9. As shown from a comparison of FIG. 2a with FIG. 2b, the interaction length L, over which the frequency conversion takes place, can be increased, so that the efficiency of the UV generation, i.e., of the generated power of the third laser beam 10, can be increased.

The beam offset δ produced by the lenses 7, 8 is selected so that the two laser beams 2, 6 will become superimposed in an overlap region in the middle of the second crystal 9. In order to ensure the beam offset δ can be adjusted, two manipulators 11, 12 (e.g., linear motors) are provided at the lenses 7, 8. The manipulators 11, 12 act on the mounts of the lenses and cause a displacement perpendicular to the optical axes thereof. In addition to or as alternative to the displacement indicated here, a tilting of the lenses 7, 8 is also possible in order to cause a separation between the first laser beam 2 and the second laser beam 6. In order to cause the separation at a specific one of the lenses 7, 8, the laser beams 2, 6 should not be perpendicular to the entrance faces and exit faces of that lens 7, 8, as is the case, for example, during propagation along the optical axis 7a, 8a, since in that case no separation can be effected (see, e.g., FIG. 2b).

Figure 1B:
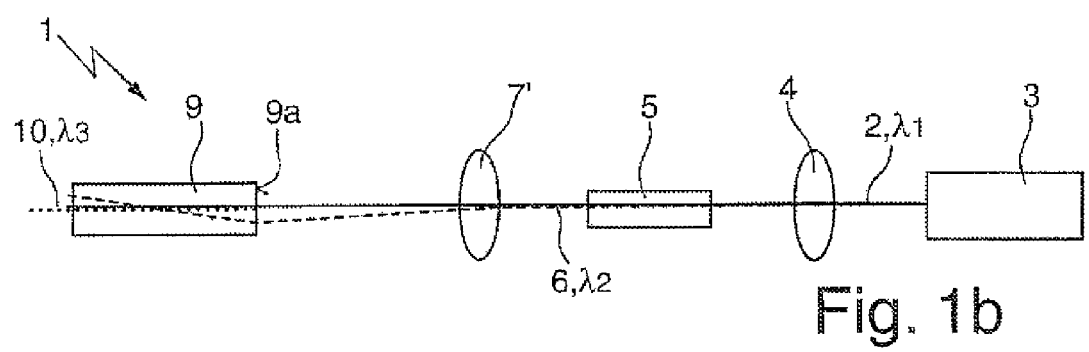

Alternative arrangements of FIG. 1a are also possible. For example, as illustrated in FIG. 1b, it is also possible to use a single lens 7' having a smaller focal length between the first crystal 5 and the second crystal 9 instead of the two lenses 7, 8. The lens 7' can be positioned in such a way that the first laser beam 2 and the second laser beam 6 strike the lens 7' paraxially, i.e., along the optical axis. Unlike the lenses 7, 8 of FIG. 1a, the lens 7' of FIG. 1b includes a birefringent material, e.g., of calcite, in which the first laser beam 2 is ordinary-refracted and the second laser beam 6 is extraordinary refracted, resulting in spatial separation of first beam 2 from second beam 6. In this connection, use can be made of the fact that the first laser beam 2 and the second laser beam 6 have polarization directions perpendicular to each other when they exit the first crystal 5.

Combinations of the arrangements illustrated in FIG. 1a and FIG. 1b are also possible. For example, in the system 1 illustrated in FIG. 1a, one or both lenses 7, 8 also can include a birefringent material. Furthermore, frequency conversions can also be produced at frequencies and wavelengths other than those described herein. In some implementations, additional optical elements, e.g., dichroic mirrors or prisms, may also be used to spatially separate the laser beams 2, 6, 10 exiting the second nonlinear crystal 9.

A number of embodiments of the invention have been described. Nevertheless, it will be understood that various modifications may be made without departing from the spirit and scope of the invention. Accordingly, other embodiments are within the scope of the following claims.

What is claimed is:

1. A system comprising:
a first nonlinear crystal, arranged to receive a first incident laser beam having a first wavelength $\lambda 1$, and operable to generate, by frequency doubling of the first laser beam, a second laser beam having a second wavelength $\lambda 2$, wherein the second laser beam propagates collinearly with the first laser beam;
a second nonlinear crystal, arranged to receive the first laser beam and the second laser beam, and operable to generate, by frequency mixing of the first laser beam and the second laser beam, a third laser beam having a third wavelength $\lambda 3$; and
one or more lenses arranged between the first nonlinear crystal and the second nonlinear crystal, wherein the one or more lenses are operable to spatially separate the first laser beam and the second laser beam from one another prior to the first laser beam and the second laser beam being incident on the second nonlinear crystal,
wherein the first laser beam and the second laser beam propagate through the one or more lenses at an offset with respect to an optical axis of the one or more lenses, or at an angle with respect to the optical axis of the one or more lenses, or at an offset and at an angle with respect to the optical axis of the one or more lenses.

2. The system of claim 1, wherein at least one of the one or more lenses comprises a birefringent material.

3. The system of claim 1, wherein the one or more lenses are operable to produce a spatial offset ($\delta$) between the first laser beam and the second laser beam at a beam entrance face of the second nonlinear crystal.

4. The system of claim 1, wherein the one or more lenses comprises a first lens and a second lens to spatially separate the first laser beam from the second laser beam, wherein the first lens comprises a collimating lens operable to collimate the first laser beam and second laser beam emerging from the first nonlinear crystal, and wherein the second lens comprises a focusing lens operable to focus the first laser beam and the second laser beam onto the second nonlinear crystal.

5. The system of claim 1, further comprising: an additional lens, separate from the one or more lenses, arranged in front of the first nonlinear crystal, wherein the lens arranged in front of the first nonlinear crystal is operable to focus the first laser beam onto the first nonlinear crystal.

6. The system of claim 1, further comprising: one or more movement devices coupled to the one or more lenses, respectively, wherein the one or more movement devices are operable to move a corresponding lens perpendicularly to an optical axis.

7. The system of claim 1, wherein at least one of the first nonlinear crystal or the second nonlinear crystal comprises lithium triborate.

8. The system of claim 1, further comprising: a laser oscillator operable to generate the first laser beam.

9. The system of claim 8, wherein the first wavelength $\lambda 1$ corresponds to a fundamental wavelength of the laser oscillator.

10. The system of claim 9, wherein the first wavelength $\lambda 1$ is about 1064 nm.

11. A method comprising:
receiving, in a first nonlinear crystal, a first laser beam having a first wavelength $\lambda 1$;
generating, in the first nonlinear crystal and by frequency doubling of the first laser beam, a second laser beam having a second wavelength $\lambda 2$, wherein the second laser beam propagates collinearly with respect to the first laser beam;
directing the first laser beam and the second laser beam toward one or more lenses, wherein the one or more lenses spatially separate the first laser beam and the second laser beam;
receiving, in a second nonlinear crystal, the spatially separated first laser beam and the second laser beam from the one or more lenses; and
generating, in the second nonlinear crystal and by frequency mixing of the first laser beam and the second laser beam, a third laser beam having a third wavelength $\lambda 3$,
wherein the first laser beam and the second laser beam propagate through the one or more lenses at an offset with respect to an optical axis of the one or more lenses, or at an angle with respect to the optical axis of the one or more lenses, or at an offset and at a angle with respect to the optical axis of the one or more lenses.

12. The method of claim 11, wherein at least one of the one or more lenses comprises a birefringent material.

13. A system comprising:
a first nonlinear crystal, arranged to receive a first incident laser beam having a first wavelength $\lambda 1$, and operable to generate, by frequency doubling of the first laser beam, a second laser beam having a second wavelength $\lambda 2$, wherein the second laser beam propagates collinearly with the first laser beam;
a second nonlinear crystal, arranged to receive the first laser beam and the second laser beam, and operable to generate, by frequency mixing of the first laser beam and the second laser beam, a third laser beam having a third wavelength $\lambda 3$;
one or more lenses arranged between the first nonlinear crystal and the second nonlinear crystal, wherein the one or more lenses are operable to spatially separate the first laser beam and the second laser beam from one another prior to the first laser beam and the second laser beam being incident on the second nonlinear crystal; and
one or more movement devices coupled to the one or more lenses, respectively, wherein the one or more movement devices are operable to move a corresponding lens perpendicularly to an optical axis.

* * * * *